United States Patent [19]

Barrows

[11] 3,711,847
[45] Jan. 16, 1973

[54] ELECTRIC SIGNAL FOR FISHING

[76] Inventor: Guy G. Barrows, 3305 Spring Street, Racine, Wis. 53405

[22] Filed: March 25, 1971

[21] Appl. No.: 128,008

[52] U.S. Cl. ....................340/279, 43/17, 340/283
[51] Int. Cl. .............................................A01k 97/12
[58] Field of Search ..340/279, 282, 283, 272; 43/17, 43/16

[56] References Cited

UNITED STATES PATENTS

| | | | |
|---|---|---|---|
| 3,283,438 | 11/1966 | Wagner | 43/17 |
| 2,538,788 | 1/1951 | Massino | 43/17 |
| 2,201,588 | 5/1940 | Kuhns | 43/17 |

Primary Examiner—John W. Caldwell
Assistant Examiner—Glen R. Swann, III
Attorney—Arthur J. Hansmann

[57] ABSTRACT

An electrical signal for fishing and including a battery case, batteries, and an electric bulb. Two electric contact members are supported on the case, and one of the members is of a cantilever structure extending laterally of the case and having a hook on the extending end for draping the fish line over the hook. When a fish pulls on the line, the line in turn pulls on the hook and the cantilever type electric contact member to close contact points and energize the light bulb to signal the fisherman.

1 Claim, 6 Drawing Figures

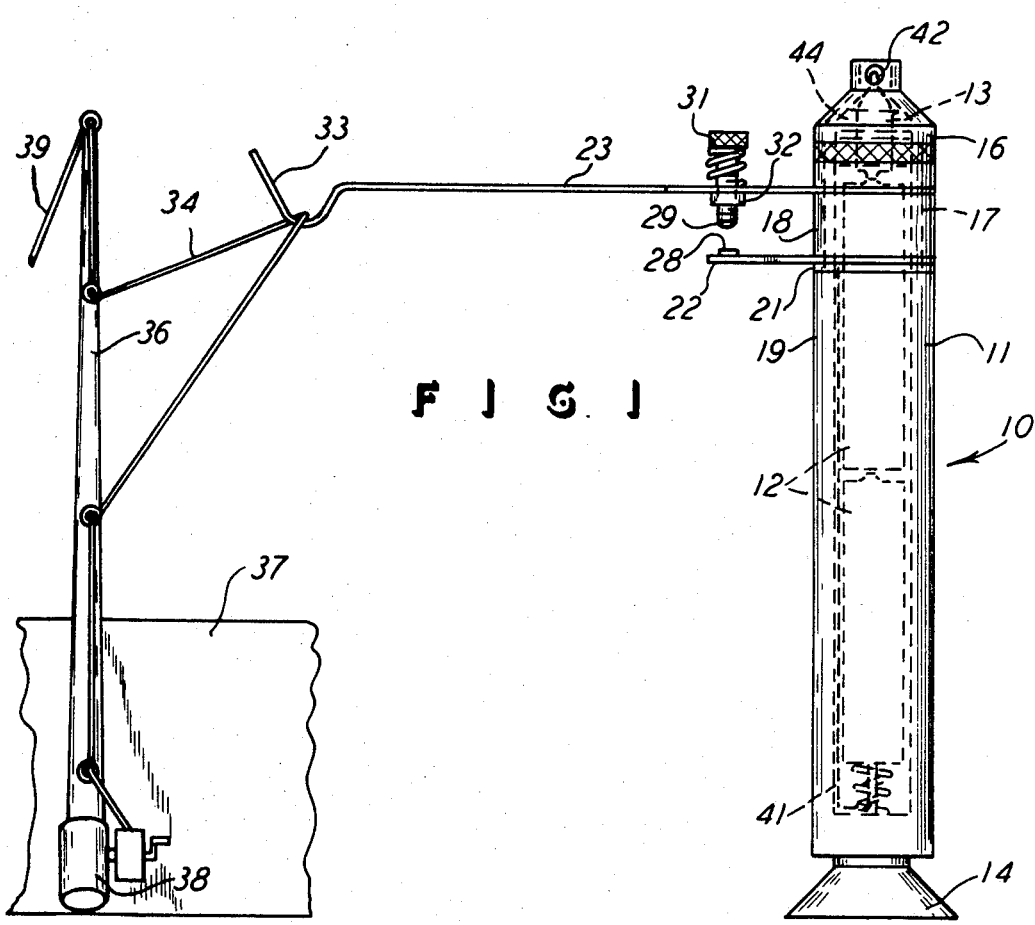
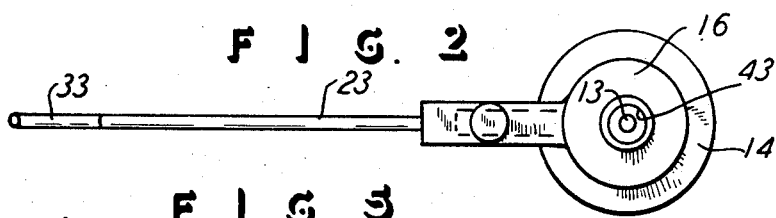
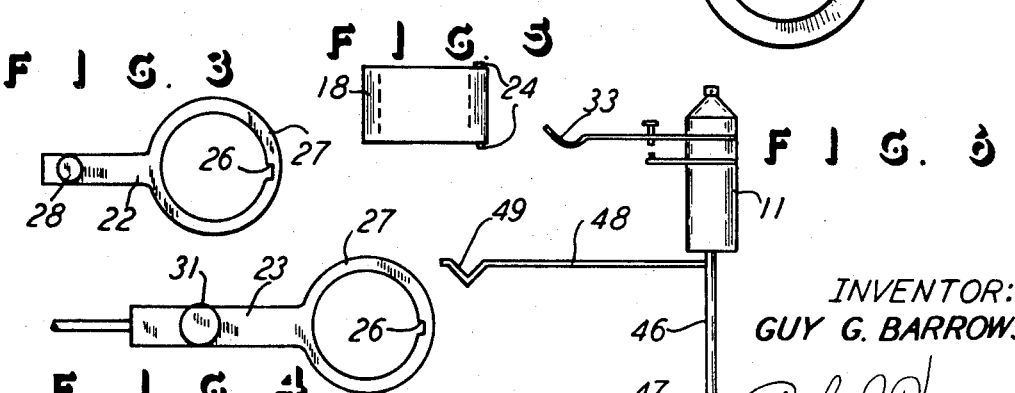
INVENTOR:
GUY G. BARROWS
ATTORNEY 3,711,847

ELECTRIC SIGNAL FOR FISHING

This invention relates to an electric signal for fishing, and, more particularly, it relates to an electric signal for fishing and which is an unattended device for use with a fish line and pole, or the like, such that when a fish pulls on the line the signal is energized to signal the fisherman.

BACKGROUND OF THE INVENTION

Electric signals for fishing are already known in the art of providing devices for signaling fishermen when the fish line is unattended. Such devices include electric light signals and audible signals, such as buzzers. These devices are commonly mounted in positions which permit either the fish line or the fishing pole to be in contact with the device such that when a fish pulls in the line, then the contacts of the device are closed and the signal is energized.

However, the electric signals known heretofore are complicated in their structure and are also arranged so that they do not permit easy connection of the device with the fish line and more importantly, they do not permit the fish line to be immediately disengaged from the device so that the fisherman can jerk up on the line or otherwise pull in the fish. Further, the prior art devices are not of the required sensitivity to respond to the nibbling of the fish on the line, and thus the devices do not operate to give the earliest signal of the presence of the fish. U. S. Pat. No. 3,020,664 shows one prior art device which is constructed and used in relationship to the entire fishing pole, and the device therefore is sufficiently insensitive so that the weight of the pole can be supported on the device without closing the electric circuit, and then the pull on the line must obviously be a large force in order to close the contacts of the device to energize the electric signal. Such devices are insensitive, in addition they are complex and require special considerations such as the particular weight of the pole, the particular way in which the pole and/or fish line are connected to the device, and other limitations are inherent in these prior art devices.

The object of this invention is to provide an improved electric signal device for fishing. More specifically, it is an object of this invention to provide an electric signal device which is simple to manufacture, easy to install and use, and which is inexpensive but yet relatively reliable in its operation.

Still more specifically, it is an object of this invention to provide a fishing device which is highly sensitive so that it signals the initial nibbling of the fish at the bait on the fish line. In accomplishing this object, the device is arranged so that only the fish line is in contact with the signal device, and the least amount of pull on the fish line will activate the device to create the signal desired.

Another object of this invention is to provide an electric signal device which has the aforementioned features and which is also adjustable so that the sensitivity of the device can be set for various fishing conditions and various types of fishing itself.

Still further, an important object of this invention is to provide an electric signal device for fishing wherein the fisherman can immediately retrieve the fish line once the signal has been energized and thereby revealed the presence of a fish. In accomplishing this object, the device is arranged so that it engages only the fish line and the fish line and pole can be immediately and directly lifted upwards, without any manipulation to otherwise disengage the fish line from the device, and thus the fisherman can immediately pull in the line in the desired rapid manner.

BRIEF DESCRIPTION OF THE DRAWINGS

FIG. 1 is a side elevational view of this device and showing it with a diagramatic showing of a fishing pole and line.

FIG. 2 is a top plan view of FIG. 1.

FIG. 3 is a top plan view of one of the contact members shown in FIG. 1.

FIG. 4 is a top plan view of a fragment of another of the contact members shown in FIG. 1.

FIG. 5 is a side elevational view of an insulation member shown in FIG. 1.

FIG. 6 is a side elevational view of the device supported on a different mounting from that shown in FIG. 1.

DETAILED DESCRIPTION OF THE PREFERRED EMBODIMENT

FIG. 1 shows an electric power unit, generally designated 10, and including a tubular casing 11 housing two batteries 12 and an electric bulb 13. A suction cup 14 is releasably attached to the bottom of the casing 11, and thus the power unit can be fixedly positioned on a flat surface and thereby held in the upright position shown in FIG. 1. A casing cap 16 is threaded into the housing along the threaded portion designated 17, and thus the cap 16 can be removed from the remainder of the casing 11 for the insertion of the batteries 12 and bulb 13. An electric insulation block 18 is disposed intermediate the portion of the cap 16 and a portion 19 of the casing 11. Also, an electric insulation washer 21 is disposed as a part of the casing 11 as hereinafter more fully described.

The casing 11 is thus shown to be tubular, and it may actually be a cylindrical piece having the hollow interior for the reception of the batteries, the bulb, and the like.

Two electric contact members 22 and 23 are mounted on the casing 11 and extend laterally thereof in a cantilever fashion as shown. These two members are preferably of a metallic material being electrically conductive and they are of a flat spring material in the embodiment shown. Thus it will be now seen that the lower contact member 22 is insulated from the casing portion 19 by means of the insulating washer 21 and the insulation casing piece 18. Also, the contact members 22 and 23 are therefore insulated from each other by means of the piece 18. To assure that the extending ends of the contacts 22 and 23 are aligned with each other with one over the other, as shown in FIG. 2, the insulating block 18 may be provided with projections 24 which key with key holes 26 in the ring portions 27 of the contact members 22 and 23. The members 22 and 23 have contact points 28 and 29, respectively, and these points are axially aligned with each other to make electric contact when the upper member 23 is flexed downwardly. Also, it will be seen that the contact point 29 is an adjustable point in that it is the lower end of a screw 31 threadedly extending through a nut 32 affixed to the member 23. Thus the gap or spacing between the points 28 and 29 can be set to the desired positions so that the desired amount of force and displacement relative to the member 23 will affect the closing of the contacts 28 and 29 to energize the signal which is the electric bulb 13.

Thus the extending end of the member 23 has an upwardly open hook 33 over which the fish line 34 is draped and extends downwardly from the hook 33, as shown in FIG. 1. Of course the line 34 would be suitably supported, such as by the fish pole 36 which in turn is leaning against a support, which may be a tackle box 37. That is, the fish pole handle 38 may be on the ground or floor support and the remainder of the pole 36 is extending angularly upwardly, as indicated in FIG. 1, and the line 34 is then positioned upwardly to be draped over the hook 33. The line 34 also has a section 39 which extends from the end of the pole 36 and downwardly into the water, all in a usual and obvious manner with respect to the pole and line.

It will then be understood that when a fish nibbles at the line 34, the line will pull downwardly on the hook 33 and this will flex the contact member 23 to where the contact points 28 and 29 touch each other and thereby complete the electric circuit. The electric circuit may be arranged such that a wire 41 extends from the bottom of the lower of the two batteries 12 and up to the contact 22 where it is connected electrically. Thus the contact 22, being connected to the batteries 12 will serve to complete the electric circuit when the contact points 28 and 29 touch each other and the bulb 13 is in electric contact with the electrically conductive casing cap 16 which in turn is in contact with the electric contact member 23 carrying the contact point 29.

The cap 16 is provided with side openings, such as the opening 42, and the bulb 13 is adjacent the opening 42 so that the light from the bulb can be readily seen in a horizontal direction. Also, the cap has a top opening 43 for further revealing the light from the bulb 13. A waterproof material at 44 is interposed between the bulb 13 and the cap 16 to prevent water from entering the openings 42 and 43.

FIG. 6 shows that a different mounting or support can be used for holding the casing 11, and in this instance a pedestal 46 is on a stand or prongs 47 which can be stood up or inserted into the shore sand itself. The casing 11 is then on the upper end of the pedestal 46, and a laterally extending arm 48 is connected to the pedestal 46 and extends to the terminal end which presents a crotch 49 for supporting the fish pole 36 in the inclined position described and indicated in FIG. 1.

In the use of the device in both the FIG. 1 and the FIG. 6 arrangement, the pole 36 is disposed laterally offset from the device's hook 33. Thus the line 34 is draped downwardly relative to the hook 33 and is extending from a laterally offset position to engage the hook 33. With these arrangements, the pole 36 can be immediately jerked up when the fisherman desires to pull in the line in response to the nibbling on the line and the consequent activation of the light bulb 13. He need not un-hook the line 34 from the device, and he does not even have to maneuver the pole 36 to avoid the device since the pole 36 is already clear of the device. Further, the arrangement is such that the slightest pull on the line 34 will flex the contact member 23 to close the contact points 28 and 29, so the device is desirably sensitive. Still further, both the contact members 22 and 23 are flexible, and thus an extended pull on the line 34 and the consequent extended flexing of the contact member 23 will only cause flexing of the member 22 and no parts will be disrupted or damaged.

The contact member 22 is thus insulated from the casing 11, including the cap 16, and the wire 41 is used to make contact to the member 22. However, the casing 11 itself could also be used for conducting current, if desired, and the arrangement would then be somewhat different from that shown but it would simply be such that the two contact members 22 and 23 are insulated from each other in a well-known manner.

What is claimed:

1. A signal for fishing, comprising an electric power unit having a casing and an electric battery and an electric signal member responsive to the flow of electric current from the battery, a pair of electric contact members mounted on said casing in spaced apart relation of one above the other and both being cantilever mounted spring members and flexible toward the away from each other for electrically closing and opening the electric circuit, an upwardly open hook on the extending end of the upper one of said contact members for receiving a fish line draped thereover and extending therefrom in the direction of flexing said upper contact member downwardly toward the lower one of said contact members, said contact members each having an electric contact point for mutually touching with each other to close the electric circuit and activate said signal when said upper contact member is flexed by a pull on the fish line.

* * * * *